United States Patent [19]
Tomisawa

[11] Patent Number: 5,664,544
[45] Date of Patent: Sep. 9, 1997

[54] APPARATUS AND METHOD FOR CONTROL OF AN INTERNAL COMBUSTION ENGINE

[75] Inventor: Naoki Tomisawa, Atsugi, Japan

[73] Assignee: Unisia Jecs Corporation, Kanagawa-ken, Japan

[21] Appl. No.: 606,252

[22] Filed: Feb. 23, 1996

[30] Foreign Application Priority Data

Feb. 24, 1995 [JP] Japan .................................. 7-037216

[51] Int. Cl.$^6$ ............................................... F02D 43/04
[52] U.S. Cl. ................... 123/421; 123/424; 123/425; 123/435
[58] Field of Search .................. 123/425, 435, 123/419, 436, 421, 424

[56] References Cited

U.S. PATENT DOCUMENTS

| | | | |
|---|---|---|---|
| 4,364,353 | 12/1982 | Fiala | 123/425 |
| 4,471,736 | 9/1984 | Yoshida et al. | 123/421 |
| 5,027,772 | 7/1991 | Hongo | 123/425 |

FOREIGN PATENT DOCUMENTS 63-17432  2/1988  Japan.

*Primary Examiner*—Andrew M. Dolinar
*Attorney, Agent, or Firm*—Lowe, Price, LeBlanc & Becker

[57] ABSTRACT

Within a predetermined time immediately after start up, ignition timing is retarded within a range wherein the output fluctuations do not exceed a predetermined permissible limit. Subsequently under conditions after elapse of the predetermined time but when warm up has not yet been completed, air-fuel ratio is weakened within a range wherein the output fluctuations do not exceed a predetermined permissible limit. Then after warm up an exhaust gas recirculation amount is increased within a range wherein the output fluctuations do not exceed a predetermined permissible limit.

14 Claims, 6 Drawing Sheets

APPARATUS AND METHOD FOR CONTROL OF AN INTERNAL COMBUSTION ENGINE

1. FIELD OF THE INVENTION

The present invention relates to an apparatus and method for controlling an internal combustion engine. In particular the invention relates to technology for realizing the performance limit of an engine by feedback control of a control object of the engine such as the air-fuel ratio, ignition timing, or exhaust gas recirculation quantity, which contribute to the combustion conditions, so that output fluctuations of the engine approach a permissible limit value.

2. DESCRIPTION OF THE RELATED ART

Heretofore engine output fluctuation control has involved detecting the output fluctuations of the engine, and adjusting the air-fuel ratio and ignition timing to a combustion limit, based on the detected results.

Basically, this involves detecting the output fluctuations of the engine using combustion pressure and engine rotational speed, and weakening the air-fuel ratio and retarding the ignition timing within a range wherein the output fluctuations do not exceed a predetermined permissible limit.

In the output fluctuation control, the weakening limit for the air-fuel ratio or the retard limit for the ignition timing are determined from the basic performance of the engine. However since this changes depending on the operating conditions at the time, then an improvement in engine performance cannot always be fully realized.

For example in the case where, during the warm-up operation, the air-fuel ratio is weakened up to the combustion limit in order to improve the exhaust performance (in particular to suppress the HC, CO quantity), since in regions of particularly low temperatures such as during warm-up immediately after start-up the combustion limits are such that the possible extent of weakening is comparatively small, then any improvement in the exhaust performance due to the weakening will be minimal.

On the other hand in the case where, at the time of start-up, the ignition timing is retarded up to the combustion limit in order to hasten activation of the catalytic converter, since depending on conditions, the retard amount can be increased even in the low temperature region immediately after start-up, then by initiating retard control based on output fluctuations from immediately after start-up, early activation of the catalytic converter is possible, thus contributing greatly to improvement in the exhaust gas performance during warm-up.

When weakening control of the air-fuel ratio and retard control of the ignition timing are carried out in parallel during warm-up, then irrespective of conditions wherein the ignition timing can be retarded by a relatively large amount, the amount of retard is suppressed due to the weakening of the air-fuel ratio. Similarly, under conditions wherein the air-fuel ratio is greatly weakened in order to suppress the HC, GO quantity, the amount of weakening is suppressed due to the retarding of the ignition timing. There is thus the problem that in effect any improvement in the exhaust performance at the time of warm-up is significantly reduced.

On the other hand, for reducing the NOx, an exhaust gas recirculation (EGR) system which recirculates a portion of the exhaust gas back to the intake system is known. With the exhaust gas recirculation control in this system there is a requirement to make the exhaust gas recirculation amount as large as possible in the normal temperature region after warm-up, in order to improve the exhaust performance (NOx discharge quantity) and the fuel consumption performance.

SUMMARY OF THE INVENTION

The present invention takes into consideration the above situation, with the object of being able to change within the combustion limits, the engine control parameters such as; air-fuel ratio, ignition timing, and exhaust gas recirculation quantity which contribute to combustion performance of the engine, to the maximum limit in the direction of improving engine performance, thereby improving exhaust performance and fuel consumption performance of the engine.

Furthermore it is an object of the invention to be able to easily and accurately detect the output fluctuations of the engine, and thus be able to accurately control the engine control parameters such as air-fuel ratio.

It is a further object of the invention to improve the exhaust performance during warm-up, reduce NOx at normal temperatures, and improve fuel consumption.

To achieve the above objects, the apparatus and method according to the present invention for controlling an internal combustion engine, wherein an engine control object which contributes to the combustion conditions of the engine is feedback controlled so that output fluctuations of the engine approach a permissible limit value, includes switching and setting previously at least two of air-fuel ratio of an engine intake mixture, ignition timing and exhaust air recirculation quantity as control objects in accordance with the engine operating conditions.

With such a construction, by selecting, in accordance with the operating conditions of the engine a control object which permits a greater control width, or a control object which contributes further to improvement in engine performance, then the performance limit of the engine can be effectively extended.

Here the construction preferably includes integrating the cylinder pressure of the engine over a predetermined integration interval, and computing a parameter indicating the output fluctuations of the engine, based on the integral value.

With such a construction, the output fluctuations of the engine can be detected based on fluctuations in cylinder pressure.

Moreover, the construction may be such that, with the abovementioned construction involving computing a parameter indicating the output fluctuations, from the integral value of the cylinder pressure, a difference between a maximum value and a minimum value of the cylinder pressure integral value during a predetermined period is computed as the parameter indicating the output fluctuations of the engine.

With such a construction, the magnitude of the output fluctuations of the engine can be easily detected as the fluctuation amplitude of the cylinder pressure integral value.

Moreover, the predetermined integration interval for integrating the cylinder pressure may be a predetermined crank angle range after compression top dead center.

If the integration interval is made to correspond to a predetermined crank angle range after compression top dead center, then the combustion pressure fluctuations can be detected to a high accuracy.

With such a construction, weakening of the air-fuel ratio, retarding of the ignition timing, or increasing of the exhaust gas recirculation quantity can be carried out in accordance with the engine operating conditions.

Here the construction may be such that the output fluctuations are detected for each cylinder, and the engine control object is feedback controlled for each respective cylinder, based on the detected results.

With such a construction, it is possible to control up to combustion limits which are different for each cylinder.

The engine operating conditions for switching the engine control object, may include at least one of an elapsed time from engine start-up, an engine temperature.

With such a construction, a control object appropriate at the time of start-up is selected, or a more appropriate control object corresponding to engine temperature is selected.

More basically, the construction may be such that the ignition timing is set as the control object when the elapsed time from engine start-up is within a predetermined time, the air-fuel ratio is set as the control object when the elapsed time from engine start-up exceeds the predetermined time but the engine temperature is equal to or lower than a predetermined temperature, and the exhaust gas recirculation quantity is set as the control object when the elapsed time from engine start-up exceeds the predetermined time and the engine temperature exceeds the predetermined temperature.

With such a construction, immediately after start-up, the exhaust gas temperature can be increased by retard control of the ignition timing, thereby hastening catalytic converter activation so that the exhaust performance can be improved. Moreover, during the subsequent warm up period, the air-fuel ratio can be weakened so that the HC, CO is reduced. Furthermore, under normal temperatures, the exhaust gas recirculation quantity can be increased so that the NOx is reduced and fuel consumption performance improved.

Further objects and aspects of the present invention will become apparent from the following description of the embodiments given in conjunction with the appended drawings.

DETAILED DESCRIPTION OF THE PREFERRED EMBODIMENTS

Figure 1:
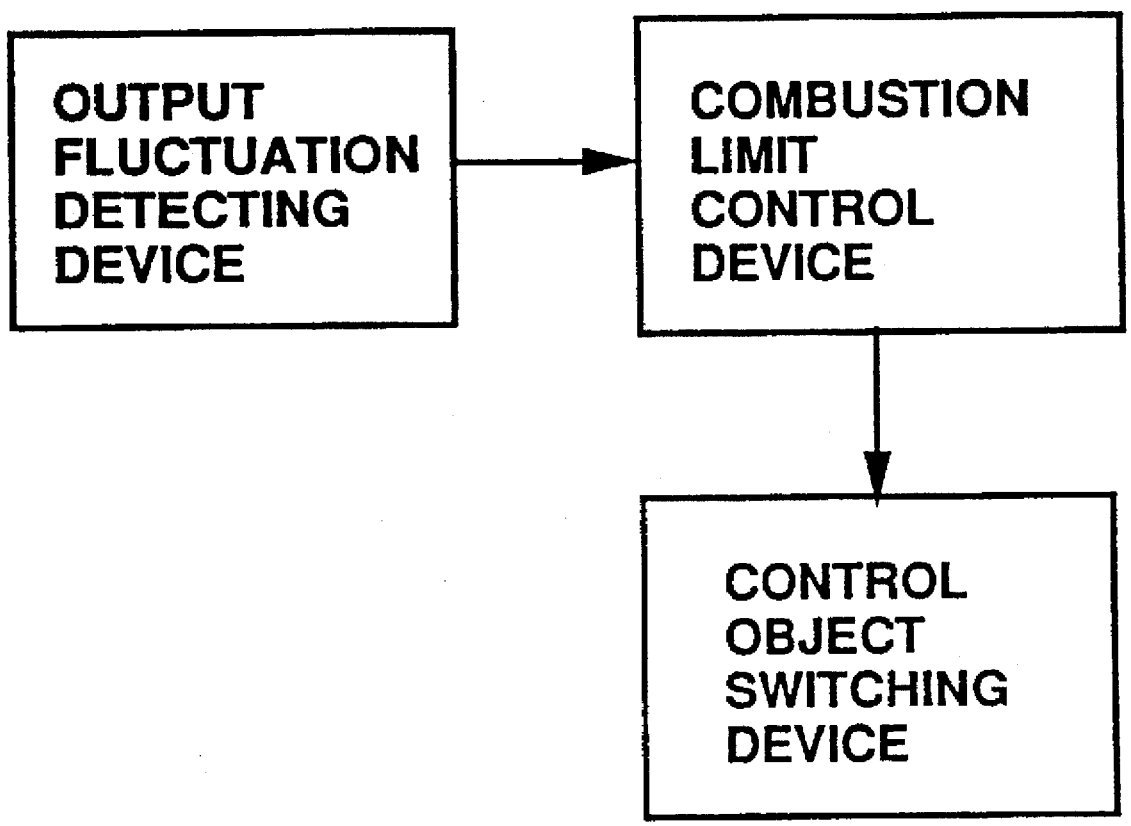
FIG. 1 is a block diagram of a basic structure of a control apparatus for an internal combustion engine according to the present invention.

FIG. 1 is a block diagram showing a basic structure of a control apparatus for an internal combustion engine according to the present invention. An output fluctuation detecting device detects output fluctuations of the engine, while a combustion limit control device feedback controls a control object of the engine which contributes to the engine combustion conditions, so that the detected engine output fluctuations approach a permissible limit value. A control object switching device switches and sets the control object of the engine which is feedback controlled by the combustion limit control device, in accordance with the engine operating conditions.

An actual embodiment of an apparatus and method for controlling an internal combustion engine, having the abovementioned basic construction will now be described.

Figure 2:
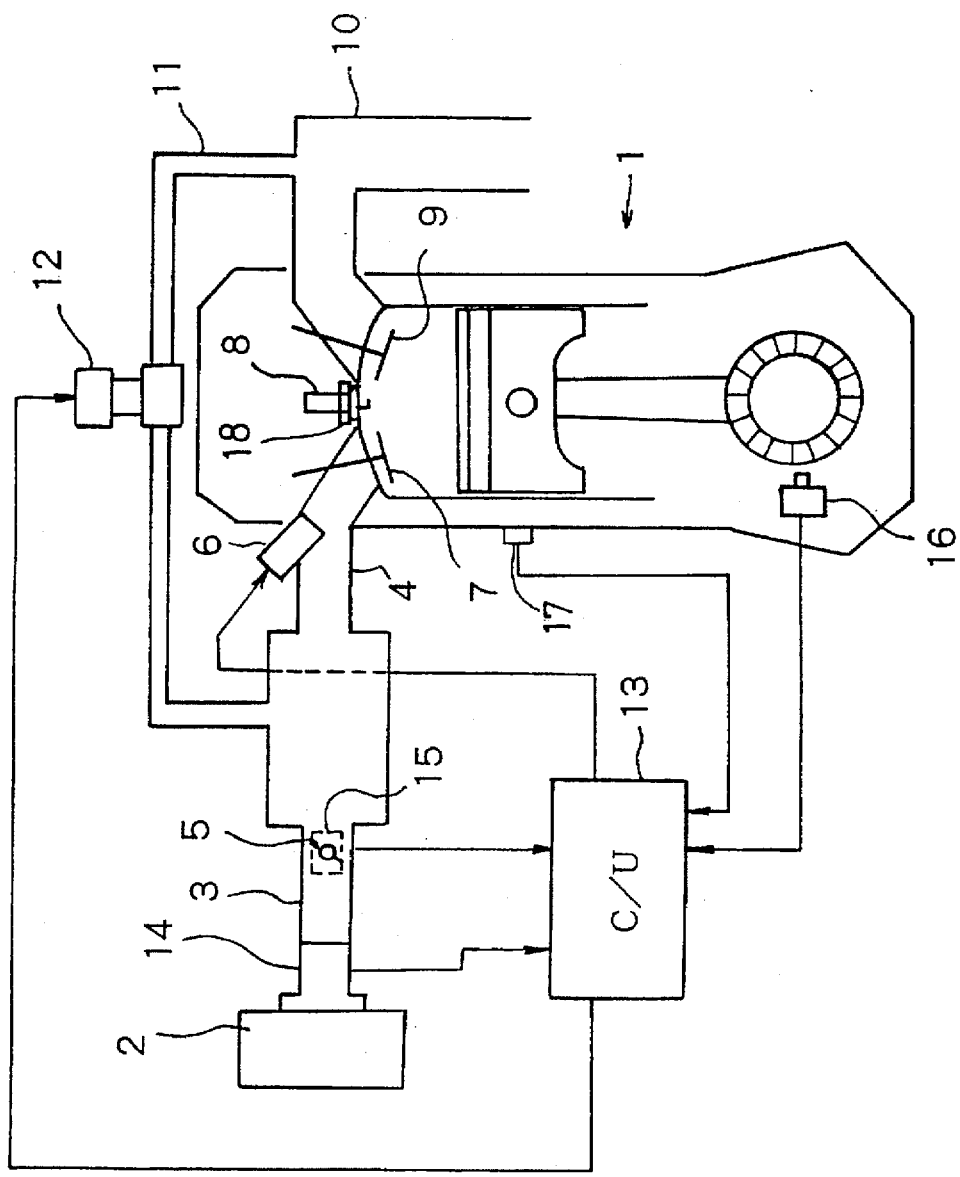
FIG. 2 is a schematic system diagram of an embodiment.

In FIG. 2 showing a system structure of the embodiment, an internal combustion engine 1 draws in air by way of an air cleaner 2, an intake duct 3, and an intake manifold 4.

A butterfly type throttle valve 5 linked to an accelerator pedal (not shown) is disposed in the intake duct 3, for adjusting the engine intake air quantity.

Solenoid type fuel injection valves 6 for each cylinder, are provided in respective branch portions of the intake manifold 4. A mixture of a predetermined air-fuel ratio is produced by electronic control of the fuel quantity injected from the fuel injection valves 6. By individually controlling the fuel injection valves 6, a mixture of different air-fuel ratio can be produced for each cylinder.

The mixture drawn into the cylinder by way of an intake valve 7, is ignited by a spark from an ignition plug 8. The combustion exhaust gases are then discharged via an exhaust valve 9, and pass out through an exhaust manifold 10 to a catalytic converter and a muffler (not shown).

An exhaust gas recirculation passage 11 having an EGR control valve 12 disposed therein, is provided for communicating between the exhaust manifold 10 (exhaust system) and the intake manifold 4 (intake system). When the EGR control valve 12 is open, a part of the exhaust gas flows back to the engine intake system, due to the pressure difference between the exhaust system and the intake system. As a result of this recirculation the combustion temperature is reduced, thereby reducing the NOx discharge quantity.

A control unit 13 which controls the fuel injection quantity from the fuel injection valves 6, the ignition timing of the ignition plugs 8, and the exhaust gas recirculation quantity using the EGR control valve 12, incorporates a microcomputer into which is input signals such as, an intake air quantity signal Q from a hot wire type air flow meter 14, a throttle valve opening signal TVO from a throttle sensor 15, a crank angle signal from a crank angle sensor 16, a cooling water temperature signal Tw from a water temperature sensor 17, and a cylinder pressure signal P from a cylinder pressure sensor 18.

The air flow meter 14 directly detects the intake air quantity of the engine 1 as a mass flow rate, based on a resistance change of a temperature sensitive resistor, due to the intake air quantity.

The throttle sensor 15 detects the opening TVO of the throttle valve 5 by means of a potentiometer.

The crank angle sensor 16 respectively detects a unit crank angle signal for each unit crank angle, and a reference crank angle signal for each predetermined piston position. The number of unit crank angle signals within a predetermined period, or the period of the reference crank angle signals, is then measured to be able to compute the engine rotational speed Ne.

The water temperature sensor 17 detects the cooling water temperature Tw inside the water jacket of the engine 1, as a temperature representative of engine temperature.

The cylinder pressure sensor 18 (cylinder pressure detecting device) is made from a piezoelectric element fitted as a washer to the ignition plug 8, such as disclosed in Japanese Unexamined Utility Model Publication No. 63-17432. By fitting this to each ignition plug 8 of the respective cylinders, the cylinder pressure P (combustion pressure) can be detected for each cylinder. With the cylinder pressure sensor 18, instead of the abovementioned type which is fitted as a washer to the ignition plug 8, this may be a type wherein a sensor portion faces directly into the combustion chamber to detect the cylinder pressure as an absolute value.

The control unit 13 determines the basic exhaust gas recirculation rate, based on the engine operating conditions such as engine load and engine rotational speed, and controls the opening of the EGR control valve 12, based on this basic exhaust gas recirculation rate. Moreover it determines the basic ignition timing (basic ignition advance angle value), based on engine operating conditions such as engine load and engine rotational speed, and controls the ignition timing for the ignition plugs 8.

Furthermore, control of the injection quantity from the fuel injection valves 6, is carried out by the control unit 13 in the following manner:

A basic fuel injection quantity Tp (=K×Q/Ne: where K is a constant) corresponding to a target air-fuel ratio is computed based on the intake air quantity Q detected by the hot wire type air flow meter 14, and the engine rotational speed Ne computed from the detection signal from the crank angle sensor 16. A correction corresponding to operating conditions such as cooling water temperature Tw, is then applied to the basic fuel injection quantity Tp, to obtain a final fuel injection quantity Ti. A drive pulse signal of a pulse width corresponding to the fuel injection quantity Ti is then output at a predetermined timing to the fuel injection valves 6. Fuel which has been regulated to a predetermined pressure by means of a pressure regulator (not shown), is supplied to the fuel injection valves 6, to thereby inject an amount of fuel proportional to the pulse width of the drive pulse signal, to form a mixture of a predetermined air-fuel ratio.

In addition to controlling the basic ignition timing, the air-fuel ratio and the exhaust gas recirculation quantity, the control unit 13 also detects the output fluctuations of the engine, based on the cylinder pressure detected by the cylinder pressure sensor 18, and carries out feedback control based on the detected results, to retard the ignition timing, weaken the air-fuel ratio, and increase the exhaust gas recirculation quantity, within a range wherein the engine output fluctuations do not exceed a permissible limit. Aspects of these controls will now be described in detail, following the flow charts of FIG. 3 through FIG. 5.

Figure 3:
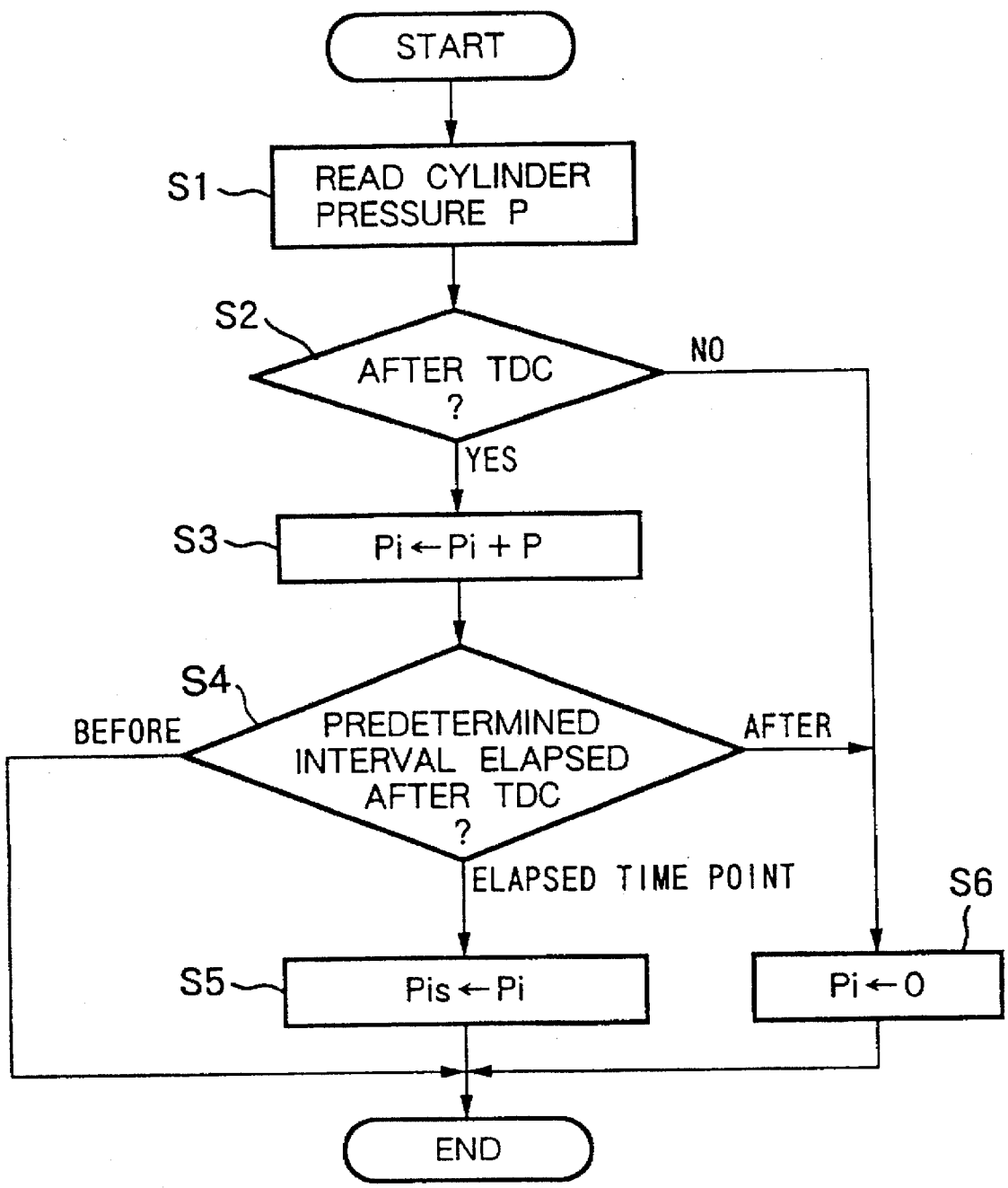
FIG. 3 is a flow chart showing an integral control routine for cylinder pressure, in the embodiment.
Figure 4:
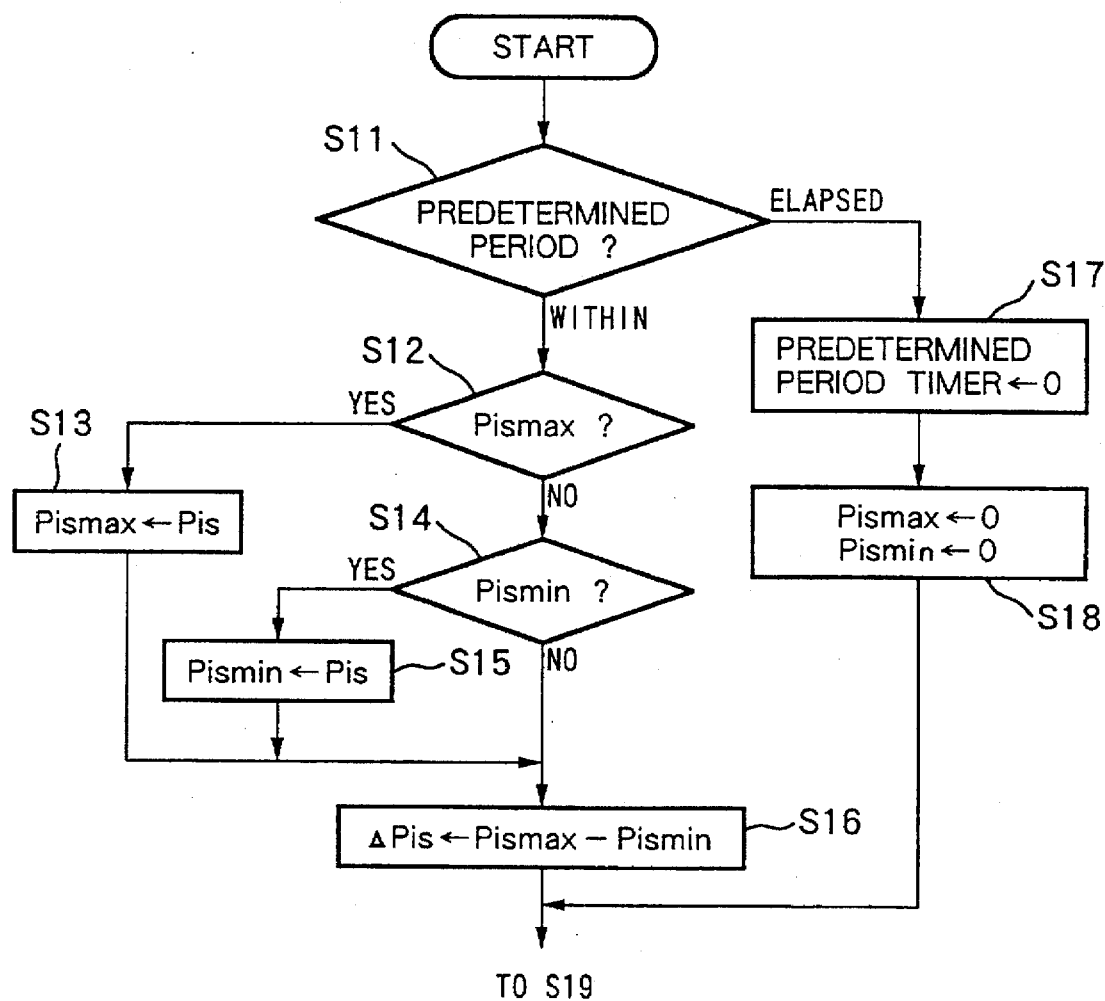
FIG. 4 is a flow chart showing a computational control routine for output fluctuation parameters, in the embodiment.
Figure 5:
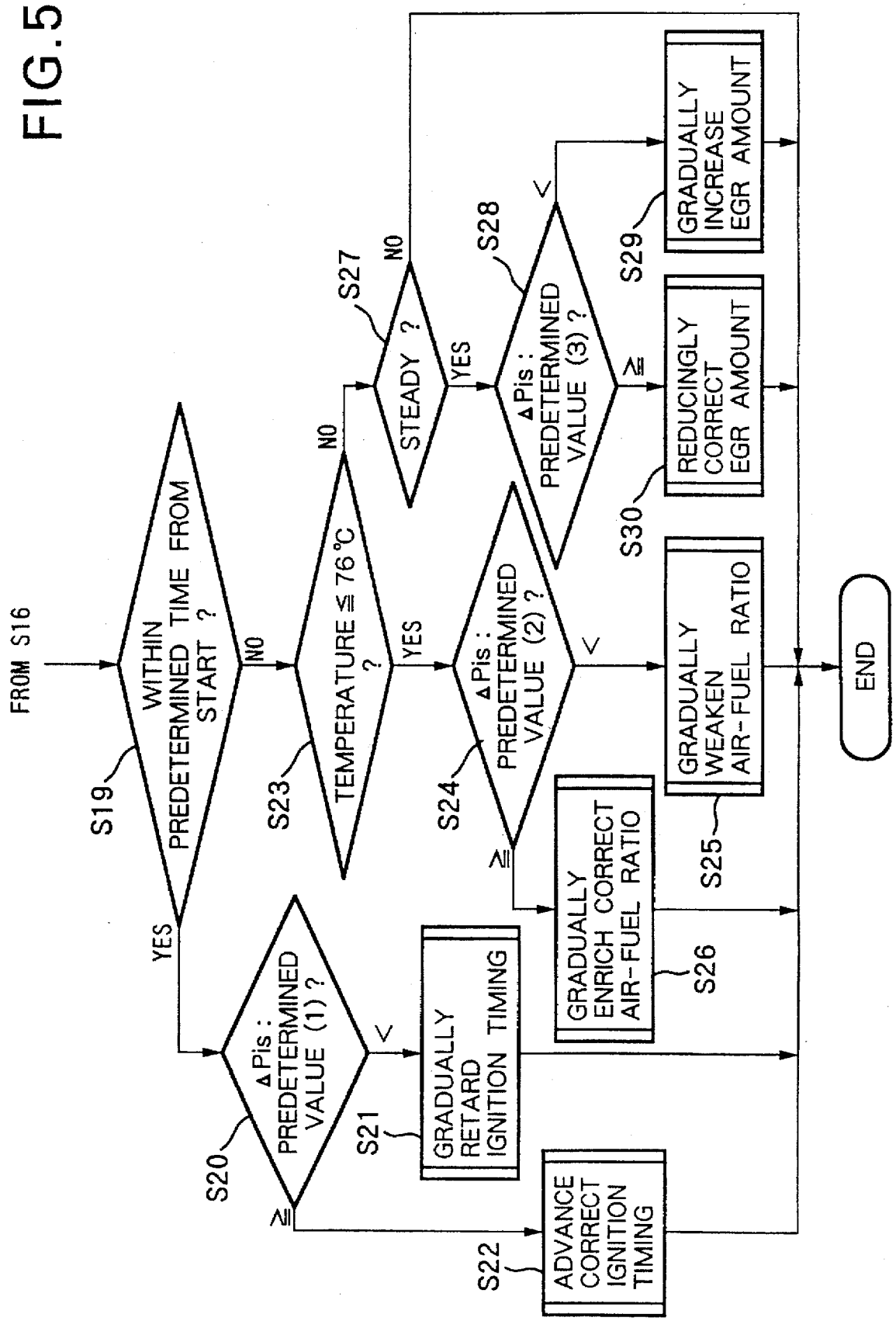
FIG. 5 is a flow chart showing a control routine for air-fuel ratio, ignition timing, and exhaust gas recirculation quantity, in the embodiment.

With the present embodiment, the functions of the output fluctuation detecting device (cylinder pressure integrating device, output fluctuation parameter computing device), the combustion limit control device, and the control object switching device, are realized by software illustrated by the flow charts of FIG. 3 through FIG. 5 and stored in the control unit 13.

The routine illustrated by the flow chart of FIG. 3 is executed for each predetermined minute interval (for example 10 μS). Initially in step 1 (with "step" denoted by S in the figures), a cylinder pressure detection signal P from the cylinder pressure sensor 18 is A/D converted and read.

In step 2, it is judged, based on the detection signal from the crank angle sensor 16, if conditions are for prior to compression top dead center. The judgment of step 2 is for judging if the next compression top dead center has been reached after completion of cylinder pressure integration over a predetermined integration interval having a start point at the compression top dead center. If conditions are for prior to compression top dead center, control proceeds to step 6 where the cylinder pressure integral value Pi is reset to zero in preparation for the next integration interval.

On the other hand, when conditions are for on or after compression top dead center, with the predetermined integration interval entered, control proceeds to step 3 where the current cylinder pressure P read in step 1 is added to the previous value of the cylinder pressure integral value Pi, and the added result updatingly set as the new cylinder pressure integral value Pi.

Then in step 4, it is judged if a predetermined interval after compression top dead center has elapsed. Here the predetermined interval is for example 100° CA. Hence in this case, the integration interval is from compression TDC to 100° CA ATDC. However the integration interval is not limited to that from compression TDC to 100° CA ATDC, and may for example be such that the cylinder pressure is integrated over one combustion cycle.

Figure 6:
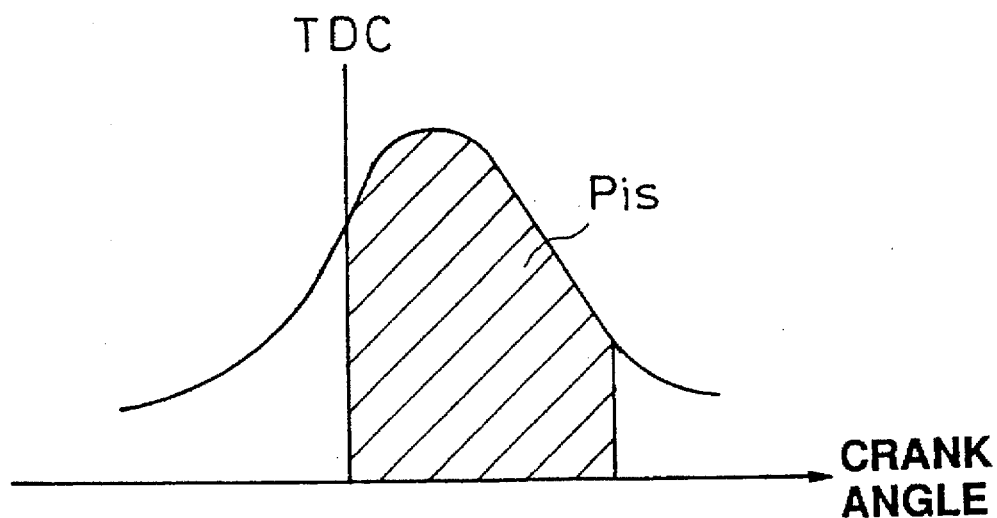
FIG. 6 is a diagram showing combustion pressure integration interval in the embodiment.

Integration of the cylinder pressure P continues with the routine terminating unchanged, until the elapse of the predetermined integration interval is judged in step 4. At the elapsed time point of the predetermined interval, control proceeds to step 5 where the integral result Pi up until then is set for the final cylinder pressure integral value Pis (refer to FIG. 6). Furthermore when conditions are for after elapse of the predetermined interval, control proceeds to step 6, where the integral value Pi is reset to zero in preparation for the next integration interval.

The construction may be such that computation of the integral value Pi is carried out for each cylinder, based on the detection signal from the cylinder pressure sensor 18 provided for each cylinder, so that output fluctuations can be detected for each respective cylinder. Furthermore, the construction may be such that a cylinder pressure sensor 18 is provided for only a representative cylinder, with the output fluctuations occurring in this cylinder being made the representative values for the output fluctuations of the engine. In the case where the output fluctuations are detected for each cylinder, then as described later, a characteristic retard amount and air-fuel ratio weakening amount for each cylinder can be set in the control for the ignition timing and the air-fuel ratio.

The routine illustrated by the flow charts of FIG. 4 and FIG. 5, illustrates the contents of the processing for computing a parameter ΔPis which indicates the output fluctuations (torque fluctuation), using the cylinder pressure integral value Pis, and feedback controlling the air-fuel ratio, ignition timing and exhaust gas recirculation quantity, based on the parameter ΔPis.

Figure 7:
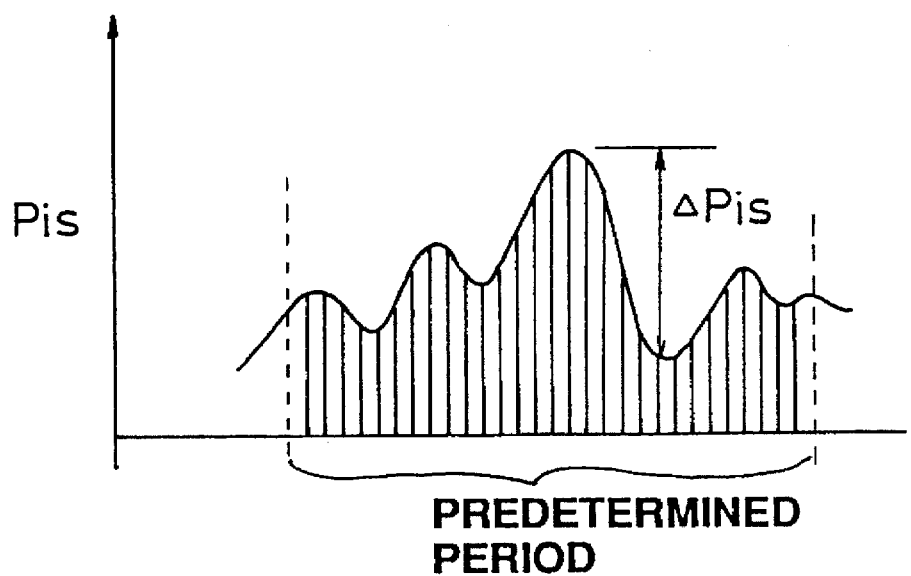
FIG. 7 is a diagram showing aspects of output fluctuation detection, in the embodiment.

In step 11, it is judged if conditions are those for within a predetermined sampling period for the cylinder pressure integral value Pis (refer to FIG. 7). When within the predetermined sampling period, control proceeds to step 12 where it is judged if the latest obtained cylinder pressure integral value Pis exceeds a maximum value Pismax up until then. If the maximum value Pismax is exceeded, control proceeds to step 13 where the latest cylinder pressure integral value Pis is updatingly set to the maximum value Pismax.

On the other hand, if the maximum value Pismax is not exceeded, control proceeds to step 14 where it is judged if the latest obtained cylinder pressure integral value Pis is less than the minimum value Pismin up until then. If less than the minimum value Pismin, control proceeds to step 15 where the latest cylinder pressure integral value Pis is updatingly set to the minimum value Pismin.

Then in step 16, a maximum fluctuation amplitude of the cylinder pressure integral value Pis occurring in a predetermined sampling period (refer to FIG. 7) is obtained by computing a difference ΔPis between the maximum value Pismax and the minimum value Pismin (ΔPis=Pismax−Pismin).

When judged in step 11 that conditions are not those for within the predetermined sampling period, control proceeds to step 17 where a timer for measuring the predetermined sampling period is reset to zero. Then in the next step 18, the maximum value Pismax and the minimum value Pismin are respectively reset to zero.

The beforementioned difference ΔPis is a parameter indicating the output fluctuations of the engine. When this difference ΔPis is larger then the output fluctuations (torque fluctuations) are judged to be larger.

In step 19, it is judged if conditions are those for immediately after start-up and within a predetermined period (for example 30 seconds) from engine start-up.

When judged to be immediately after start-up, control proceeds to step 20 where it is judged if the difference ΔPis indicating the output fluctuations is equal to or above a predetermined value (1) corresponding to the permissible limit value of the output fluctuations.

If the parameter ΔPis is less than the predetermined value (1), control proceeds to step 21 where the ignition timing (the control object), is retard corrected by a predetermined value. The retard value for the basic ignition timing is gradually increased by increasing the retard correction amount for the ignition timing by a predetermined value each time, until the difference ΔPis is equal to or above the predetermined value (1).

If the difference ΔPis becomes equal to or above the predetermined value (1), it is judged that the output fluctuations have exceeded the permissible limits. Therefore, in order to restore the combustion stability, in step 22 the ignition timing is corrected to the advanced angle side by a predetermined value (the retard correction amount is reduced by a predetermined value).

Feedback control for the ignition timing which is based on the difference ΔPis, controls so that the output fluctuations approach the permissible limit value. Effectively this retards the ignition timing to a maximum limit within a range wherein the output fluctuations do not exceed the permissible limit.

If the ignition timing is retarded, then activation of the exhaust purification catalytic converter can be hastened due to an increase in exhaust temperature so that exhaust performance during warm up can be improved. In particular, since a comparatively large amount of retard is possible even under conditions of low engine temperature immediately after start up, then by initiating retard control from immediately after start-up, catalytic converter activation in the early period from start-up can be achieved.

Here the construction is such that the retard control of the ignition timing is carried out independently, rather than being carried out simultaneously with the control for weakening the air-fuel ratio within the permissible region of the output fluctuations. That is to say, since at the time of low temperatures immediately after start-up, the combustion limits are such that the possible extent of weakening of the air-fuel ratio is comparatively small, then any improvement in exhaust performance due to weakening will be minimal. Moreover if, weakening control is carried out in parallel with the retard control, then the possible amount of retard becomes limited, so that the catalytic converter activation effect is impaired. As a result, any improvement in the exhaust performance due to the feedback control being carried out based on the output fluctuations is significantly impaired. Therefore from start-up until a predetermined time has elapsed, only the ignition timing retard control is carried out.

When the predetermined period from start-up has elapsed, then control proceeds from step 19 to step 23 where it is judged if the cooling water temperature Tw, which is representative of engine temperature, is equal to or less than a predetermined temperature (for example 76° C.).

If the cooling water temperature Tw is equal to or less than the predetermined temperature, that is to say a condition not immediately after start-up but one where warm up has not yet been completed, control proceeds to step 24 where the difference ΔPis and a predetermined value (2) are compared. If the difference ΔPis is less than the predetermined value (2), then in step 25 the air-fuel ratio, being the control object, is gradually weakened until the difference ΔPis is equal to or greater than the predetermined value (2). When the difference ΔPis becomes equal to or greater than the predetermined value (2) it is considered that the weakening is excessive. Hence in step 26, the air-fuel ratio is corrected to the rich side. That is to say, the air-fuel ratio is enriched to the maximum limit within the region wherein the output fluctuations do not exceed the permissible limit.

The weakening of the air-fuel ratio is carried out for example by reducing a multiplication correction term for the fuel injection quantity Ti, by successive predetermined values.

With weakening of the air-fuel ratio under conditions of low engine temperature immediately after start-up, the combustion limit is exceeded with only a slight weakening and hence the effect is small. However once the engine temperature has risen by a certain amount, the permissible range for weakening is increased so that a greater effect can be ensured. Therefore with the present embodiment, when a predetermined period after start-up has elapsed and a rise in the engine temperature is observed, so that conditions are such that the air-fuel ratio can be weakened above a certain amount, control is switched from that for retarding the ignition timing to a maximum limit, to that for weakening the air-fuel ratio to the maximum limit, thus achieving an improvement in exhaust performance during warm-up, in particular with the reduction in HC and CO.

That is to say, once a certain amount of catalytic converter activation due to retard control of the ignition timing is observed, control is switched to that for weakening the air-fuel ratio, and the generation amount of HC, CO is thus suppressed. Since at the time of weakening the air-fuel ratio, retard control of the ignition timing is not carried out, the weakening can be proceeded to the maximum limit, so that the HC, CO reduction effect can be obtained to the full.

In this way, with the present embodiment, the warm up operating period is separated into two periods, namely the period from start-up until the elapse of a predetermined time, and the subsequent period where the cooling water temperature rises to a predetermined temperature. In the former period, catalytic converter activation is carried out by retard control of the ignition timing, while in the latter period, suppression of the amount of HC, CO is achieved by weakening the air-fuel ratio. Hence based on this, the exhaust performance during warm-up is improved.

On the other hand, in step 23, when judged that the cooling water temperature Tw exceeds a predetermined temperature (for example 76° C.), control proceeds to step 27 where it is judged if the engine 1 is in a steady condition, based on a rate of change in the rotational speed Ne and/or the basic fuel injection quantity Tp.

At the time of transient operation, the exhaust gas recirculation quantity is not controlled to increase to the maximum extent within the region wherein the output fluctuations do not exceed the permissible limit, however, normally feedforward controlled based for example on the engine load and rotational speed.

At the time of steady operation, control proceeds to step 28 where the difference $\Delta Pis$ and a predetermined value (3) are compared. If less than the predetermined value (3), then in step 29 the exhaust gas recirculation quantity, being the control object, is gradually increased until the difference $\Delta Pis$ is equal to or greater than the predetermined value (3). When the difference $\Delta Pis$ becomes equal to or greater than the predetermined value (3), then in step 30, the exhaust gas recirculation quantity is reducingly corrected so as to restore operating stability. That is to say, the exhaust gas recirculation quantity is increased to the maximum limit within the region wherein the output fluctuations do not exceed the permissible limit.

Under conditions wherein, even though there is steady operation, the exhaust gas recirculation is stopped by normal control, then the abovementioned control of the exhaust gas recirculation quantity based on the output fluctuations is not carried out.

If the exhaust gas recirculation quantity is increased in the above manner, within the limit wherein the output fluctuations do not exceed the permissible level, then the NOx reduction and fuel consumption improvement effect due to the exhaust gas recirculation can be obtained to the maximum limit. In particular, in the normal temperature state, by carrying out only control of the exhaust gas recirculation quantity without the weakening control of the air-fuel ratio and the retard control of the ignition timing, then the exhaust gas recirculation quantity can be increasingly controlled to the maximum limit, so that the NOx reduction and fuel consumption improvement effect is substantial.

When the integral value $Pi$ is computed as mentioned above for each cylinder, then the control related to ignition timing and air-fuel ratio, as illustrated by the flow chart of FIG. 5, is carried out for each cylinder, so that the ignition timing and air-fuel ratio (fuel injection quantity) can be controlled independently for each respective cylinder. Due to this ignition timing and air-fuel ratio control for each cylinder, then control can be carried out to retard limits and weakening limits which differ for each cylinder.

Although the present invention has been described and illustrated in detail, it should be clearly understood that the same is by way of illustration and example only and is not to be taken by way of limitation, the spirit and scope of the present invention being limited only by the terms of the appended claims.

I claim:

1. An apparatus for controlling an internal combustion engine, comprising:

output fluctuation detecting means for detecting output fluctuations of the engine;

combustion limit control means for feedback controlling an engine control object so that output fluctuations detected by said output fluctuation detecting means approach a permissible limit value; and control object switching means for setting previously at least two of air-fuel ratio of an engine intake mixture, ignition timing and exhaust air recirculation quantity as control objects in accordance with engine operating conditions at the time.

2. The apparatus according to claim 1, wherein:

said output fluctuation detecting means comprises
cylinder pressure detecting means for detecting the cylinder pressure of the engine,
cylinder pressure integrating means for integrating the detected cylinder pressure over a predetermined integration interval to obtain a cylinder pressure integral value, and
output fluctuation parameter computing means for computing a parameter indicating the output fluctuations, based on the cylinder pressure integral value.

3. The apparatus according to claim 2, wherein:

said output fluctuation parameter computing means computes a difference between a maximum value and a minimum value of the cylinder pressure integral value during a predetermined period as the parameter indicating the output fluctuations.

4. The apparatus according to claim 2, wherein:

said predetermined interval for integrating the cylinder pressure in said cylinder pressure integrating means corresponds to a predetermined crank angle range after compression top dead center.

5. The apparatus according to claim 1, wherein:

said output fluctuation detecting means detects the output fluctuations for each cylinder, and
said combustion limit control means feedback controls the engine control object for each respective cylinder.

6. The apparatus according to claim 1, wherein:

the engine operating conditions for switching and setting the engine control object in said control object switching means incudes at least one of an elapsed time from engine start-up and an engine temperature.

7. The apparatus according to claim 1, wherein:

said control object switching means sets the ignition timing as the control object when an elapsed time from engine start-up is within a predetermined time, sets the air-fuel ratio as the control object when the elapsed time from engine start-up exceeds said predetermined time but the engine temperature is equal to or below a predetermined temperature, and sets the exhaust gas recirculation quantity as the control object when the elapsed time from engine start-up exceeds said predetermined time and the engine temperature exceeds said predetermined temperature.

8. A method of controlling an internal combustion engine, including the steps of:

feedback controlling an engine control object which contributes to combustion conditions of the engine so that output fluctuations of the engine approach a permissible limit value; and switching and setting previously at least two of air-fuel ratio of an engine intake mixture, ignition timing and exhaust air recirculation quantity as control objects in accordance with the engine operating conditions.

9. The method according to claim 8, including the further steps of:

integrating a cylinder pressure of the engine over a predetermined integration interval to obtain an integral value; and computing a parameter indicating the output fluctuations of the engine based on the integral value.

10. The method according to claim 9, wherein:

a difference between a maximum value and a minimum value of the integral value during a predetermined period is computed as the parameter indicating the output fluctuations of the engine.

11. The method according to claim 9, wherein:

the predetermined integration interval for integrating the cylinder pressure corresponds to a predetermined crank angle range after compression top dead center.

12. The method according to claim 8, wherein:

the output fluctuations are detected for each cylinder, and the engine control object is feedback controlled for each respective cylinder based on the detected results.

13. The method according to claim 8, wherein:

the engine operating conditions for switching and setting the engine control object include at least one of an elapsed time from engine start-up and an engine temperature.

14. The method according to claim 8, wherein:

ignition timing is set as the control object when an elapsed time from engine start-up is within a predetermined time, the air-fuel ratio is set as the control object when the elapsed time from engine start-up exceeds the predetermined time but the engine temperature is equal to or below a predetermined temperature, and the exhaust gas recirculation quantity is set as the control object when the elapsed time from engine start-up exceeds the predetermined time and the engine temperature exceeds the predetermined temperature.

* * * * *